UNITED STATES PATENT OFFICE.

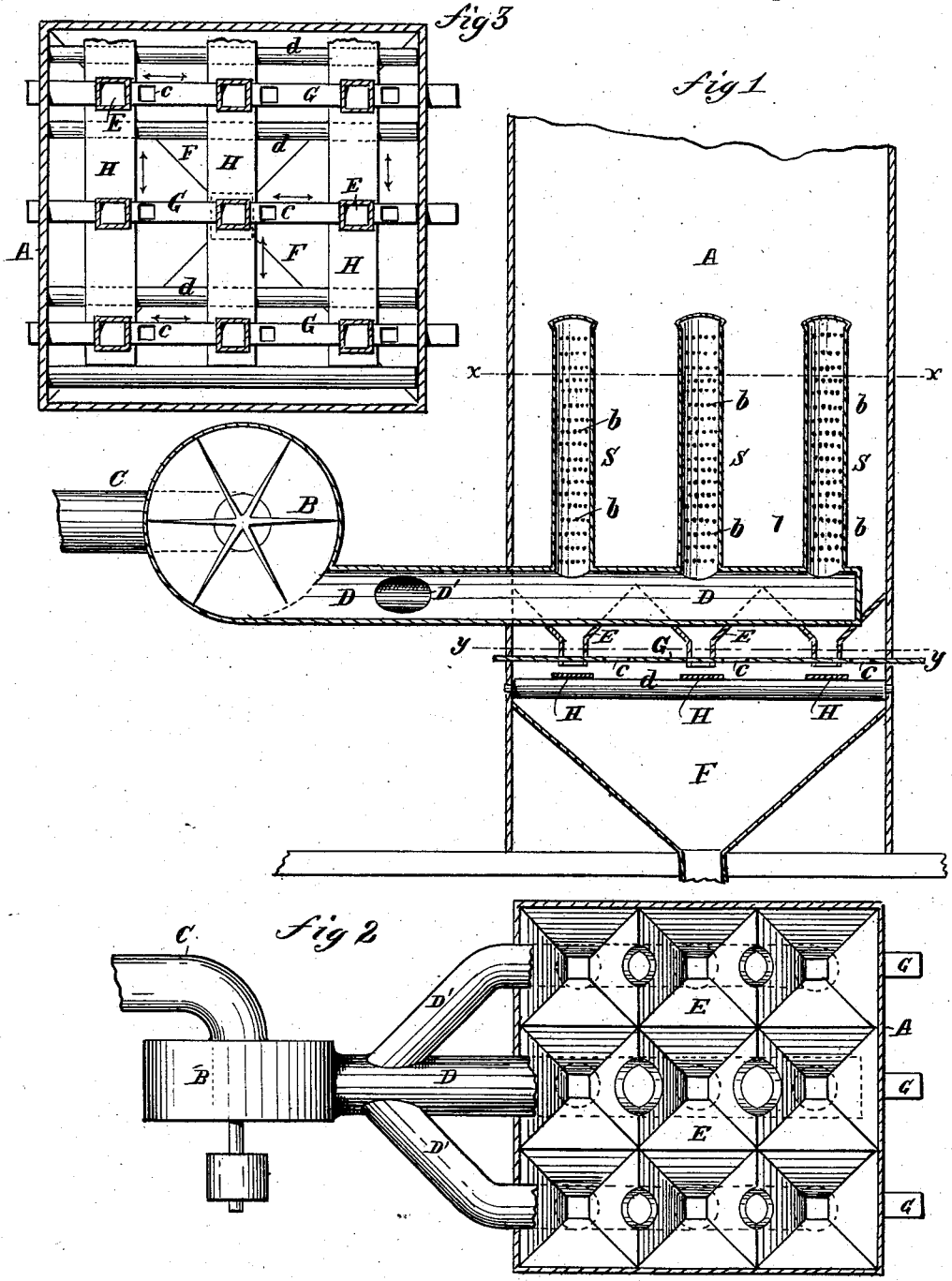

NELS W. HAWKENSON, OF LITCHFIELD, MINNESOTA.

APPARATUS FOR DRYING GRAIN.

SPECIFICATION forming part of Letters Patent No. 260,567, dated July 4, 1882.

Application filed May 15, 1882. (No model.)

*To all whom it may concern:*

Be it known that I, NELS W. HAWKENSON, of Litchfield, in the county of Meeker and State of Minnesota, have invented a new and Improved Apparatus for Drying Grain, of which the following is a full, clear, and exact description.

The object of this invention is to dry damp or wet grain and to restore the same to its proper quality and grade.

My invention consists of the combination and arrangement of parts substantially as hereinafter more fully set forth.

Reference is to be had to the accompanying drawings, forming part of this specification, in which similar letters of reference indicate corresponding parts in all the figures.

Figure 1 represents a vertical section of a grain-bin with my invention applied. Fig. 2 is a horizontal section of the same on the line *x x*, but showing the air-blast pipes as broken away in full lines, and their continuation, with the perforated distributing-pipes mounted on them, in dotted lines; and Fig. 3, a further horizontal section on line *y y*.

A in the drawings indicates a grain-bin similar to the bins now in use in elevators and warehouses.

B is a blower or fan for drawing in hot or cold dry air from a reservoir or other source by a pipe, C, and forcing and delivering it by a pipe, D, and branches D' into upright tubes S, mounted thereon and arranged to project up within the grain in the bin. These tubes, which are open at their lower ends, but closed at their upper ones, are perforated at their sides with an extended series of small apertures, *b*. Said tubes may be of any desired length to extend up into the lower part of the body of the bin, and are arranged above a corresponding number of primary hoppers, E, through which the grain is delivered into a general hopper, F, at the base of the body of the bin, subject to the control of slides G and feeders H. The slides G pass through the spouts of a series of the primary hoppers E, and are reciprocated in direction of their length by any suitable means to bring delivery apertures *c* in them at intervals in line with the spouts of said hoppers, so that grain may pass through said slides onto the feeders H, arranged below the slides in transverse relation with the slides. These feeders, which rest on rollers *d d*, are also designed to be reciprocated by any suitable outside means, or by a reverse motion to one or more of the rollers on which they rest, and they also are each extended to control a series of the hoppers E, though situated below them and their slides.

The dry air forced through the perforated distributing-tubes S into the mass of grain in the lower part of the body of the bin will effectually dry that part of the wet grain lying nearest to said tubes first, and for this reason said tubes S are placed directly over the hoppers E. The object of this is to draw off the dry grain as soon and as fast as it is dried, and wet grain may be supplied to the bin at its top as rapidly as the dried grain is drawn off at the bottom.

The feeders H, transversely arranged in relation with the slides, as described, and only at a short distance below them, check the too free run of the grain through the slides when open, and accordingly, as they are moved, pass the dried grain delivered onto them into the general hopper F, either slowly or rapidly, as required, the slides G and spouts of the hoppers E serving to "strike" or pass off the grain from the feeders H as the latter are moved transversely beneath the slides.

By this method of using dry air and discharging the grain the same effect is produced as takes place when wet cut grain in the field is exposed to currents of air or wind, and the grain is restored to the same dry and healthy condition.

Instead of the fan or blower B, any other suitable air-forcing apparatus may be used.

Having thus fully described my invention, I claim as new and desire to secure by Letters Patent—

1. The combination of the bin A, the air-delivery pipes D D', a blowing apparatus or device for forcing dry air through said pipes, the perforated air-distributing pipes S, mounted on the delivery-pipes, and the primary hoppers E, with their slides G and the lower transverse feeders, H, substantially as and for the purposes herein set forth.

2. The combination, with the bin A, of the horizontal pipes D D′, connected with a blast apparatus, and having the vertical apertured pipes S, the series of primary hoppers E, arranged below the said pipes, the reciprocating slides G, the transverse reciprocating feeders H, and the chute or general hopper F, disposed below the aforesaid hoppers, substantially as described.

NELS W. HAWKENSON.

Witnesses:
GEORGE NEWLANDS,
CHARLES H. STROBECK.